(12) United States Patent
Limatibul

(10) Patent No.: US 11,702,262 B2
(45) Date of Patent: Jul. 18, 2023

(54) POLYESTER LAMINATE TUBE FOR CONTAINER

(71) Applicant: KIMPAI LAMITUBE CO., LTD., Bangkok (TH)

(72) Inventor: Sumet Limatibul, Bangkok (TH)

(73) Assignee: KIMPAI LAMITUBE CO., LTD., Bangkok (TH)

(*) Notice: Subject to any disclaimer, the term of this patent is extended or adjusted under 35 U.S.C. 154(b) by 1079 days.

(21) Appl. No.: 16/315,815

(22) PCT Filed: Mar. 22, 2017

(86) PCT No.: PCT/TH2017/000024
§ 371 (c)(1),
(2) Date: Jan. 7, 2019

(87) PCT Pub. No.: WO2018/124976
PCT Pub. Date: Jul. 5, 2018

(65) Prior Publication Data
US 2019/0300252 A1  Oct. 3, 2019

(30) Foreign Application Priority Data

Dec. 27, 2016  (TH) .............................. 1601007772

(51) Int. Cl.
| | | |
|---|---|---|
| *A61J 1/10* | (2006.01) | |
| *B65D 65/40* | (2006.01) | |
| *B32B 27/08* | (2006.01) | |
| *B32B 27/30* | (2006.01) | |
| *B32B 27/32* | (2006.01) | |
| *B32B 27/36* | (2006.01) | |
| *B32B 27/34* | (2006.01) | |

(52) U.S. Cl.
CPC .............. *B65D 65/40* (2013.01); *B32B 27/08* (2013.01); *B32B 27/30* (2013.01); *B32B 27/306* (2013.01); *B32B 27/32* (2013.01); *B32B 27/34* (2013.01); *B32B 27/36* (2013.01); *B32B 2439/00* (2013.01)

(58) Field of Classification Search
CPC ......... B32B 27/08; B32B 27/36; B32B 27/32; B32B 27/306
See application file for complete search history.

(56) References Cited

U.S. PATENT DOCUMENTS

| | | |
|---|---|---|
| 5,612,106 A | 3/1997 | Komiya et al. |
| 5,942,320 A | 8/1999 | Miyake et al. |
| 6,896,754 B2 | 5/2005 | Yamaguchi et al. |
| 2005/0069660 A1 | 3/2005 | Climenhage |

FOREIGN PATENT DOCUMENTS

| | | | |
|---|---|---|---|
| CN | 101522035 A | 9/2009 | |
| DE | 102005023337 | * 11/2006 | ............. B32B 27/08 |
| WO | DK01/00289 | 11/2001 | |
| WO | 2016/053956 A1 | 4/2016 | |

OTHER PUBLICATIONS

International Search Report (ISR) for International Application No. PCT/TE2017/000024.
Written Opinion (WO) for International Application No. PCT/TH2017/000024 dated Sep. 20, 2017.
CN 101522035 A _Espacenet_English_Abstract.

* cited by examiner

*Primary Examiner* — Ellen S Hock
(74) *Attorney, Agent, or Firm* — Ladas & Parry LLP

(57) ABSTRACT

A polyester film laminated with other polymers to form a sheet. A laminated tube for liquid and paste products such as toothpastes, and the like can be manufactured from said sheet. The laminate comprises an outer polyethylene film, adhesive agent layers, a polyester film, and a composite polyethylene film comprising at least one co-extruded polyethylene layer sandwiched by at least one polyethylene film and an inner polyethylene film.

12 Claims, No Drawings

POLYESTER LAMINATE TUBE FOR CONTAINER

RELATED APPLICATION

This application is a national phase entry under 35 USC 371 of International Patent Application No.: PCT/TH2017/000024 filed on 22 Mar. 2017, which claims priority from TH Application No. 1601007772 filed on 27 Dec. 2016, the disclosures of which are incorporated in their entirety by reference herein.

FIELD OF THE INVENTION

This present invention is in the field of materials science and relates to a polyester laminate tube for a packaging

BACKGROUND ART

A polyester film, particularly a biaxially-oriented film composed of polyethylene terephthalate, has been widely used as a packaging material or as a base for a reprographic film, etc. Common use of a PET film is the use for laminating with other polymers, paper or foil. The PET film is often coated with polyethylene or an ethylene copolymer by extrusion coating in order to obtain heat-sealing capability, adhesion to another material such as aluminium foil, additional bulk (thickness) or stiffness, or in order to achieve properties that are not possible to obtain with the PET film alone. Unfortunately, the surface of the PET film is not very receptive to the extrusion coating with other polymers. Solvent-based polyurethane adhesives and polyethylene-imine primers are commonly used in order to solve this problem. The PET film subjected to treating or priming for the extrusion coating without additional priming or corona treatment is preferable for a converter in order to laminate with other polymers.

A sheet material mainly uses for manufacturing a laminated tube container comprised of a plastic film in a tube body in order to prevent the contents from deterioration due to oxidation caused by oxygen coming from the outside of the laminated tube container. A material with excellent oxygen barrier property, water-vapor barrier property, etc. is exemplified as a barrier film laminated together with a polyethylene layer or another sealant layer. Aluminium foil is the most widely used material because of its very high gas barrier properties. However, the aluminium foil is inevitably opaque, so that it is not possible to see through the aluminium barrier laminate tube right to the contents inside. Hence, there is an increasing demand for the laminated tube container with high transparency.

A wide variety of PET laminates have been found to be useful in manufacturing of various designs of the packaging, and the following patents describe the types of laminate compositions that have been successfully used in the packaging of consumer goods.

U.S. Pat. No. 5,612,106 discloses a laminated tube container having the body comprising a substrate, a silicon oxide deposited layer, a heat buffer layer, and an extruded coating layer of a thermoadhesive resin. The heat buffer layer, such as PET, etc., prevents cracks from being generated in the silicon oxide deposited layer by the heat coming when the extruded coating layer of the thermoadhesive resin is laminated. The heat buffer layer is preferably formed by dry lamination or non-solvent lamination which requires no heating. An anchor coat layer may optionally be provided between the heat buffer layer and the extruded coating layer of the thermoadhesive resin so that the adhesion strength between these layers can be improved.

U.S. Pat. No. 5,942,320 discloses a barrier composite film comprising a base film, an anchor coat layer containing a silane coupling agent and a barrier resin such as a vinylidene chloride-series copolymer, an ethylene-vinyl alcohol copolymer, or etc., wherein the layers are formed on at least one side of the base film in the order of reference. The anchor coat layer can be made of a chlorine-containing resin, a polyisocyanate compound, and a saturated polyester resin having a glass transition temperature of −10° C. to 20° C. A heat-sealing layer may be formed on the surface of the coating layer or the other side of the base film. This composite film provided with the inorganic layer can avoid losses of its adhesive properties and barrier properties even under severe conditions such as retort treatment.

PCT Patent application No. PCT/DK01/00289 discloses a plastic laminate consisting of at least one plastic web and at least two plastic films disposed on each side of the plastic web and preferably connected to a web bond, wherein the laminate is pliable, and wherein respective melting points of the plastic films are approximately the same.

U.S. patent Ser. No. 10/493,088 discloses a composite film structure comprising a six-layered film. An outer layer is a non-melting layer such as oriented polyester. A second layer is linear low density polyethylene (LLDPE). A fourth layer is an EVOH layer sandwiched with an adhesive (third) layer. A fifth layer is a sealant layer. This composite film is useful for manufacturing pouches using rotary thermic sealing.

U.S. Pat. No. 6,896,754 B2 discloses a wrapping clean film comprising at least two layers of thermoplastic resin films. The wrapping clean film is formed by dry-laminating co-extruded films composed of at least two layers of thermoplastic films on both front and rear surfaces of a heat-resisting substrate.

SUMMARY OF THE INVENTION

The present invention relates to a polyester film laminated with other polymers to form a sheet. A laminated tube for liquid and paste products such as toothpastes, lotions, and the like can be manufactured from said sheet. The present invention also relates to a laminated tube container having a body made of a sheet material comprising an outer polyethylene film, a polyester film, and an inner polyethylene film, which is formed into a laminated tube. This laminate tube can be used for storing paste products such as lotions, creams. toothpastes, and the like.

DETAILED DESCRIPTION

This invention aims to provide a laminated tube container having gas barrier properties as well as a scratch resistance. The laminated tube for a packaging is commonly decorated by surface printing such as letterpress printing, flexographic printing, UV offset printing, etc. Direct or reverse printing on PET is also possible for the laminated tube. The printed PET film is further laminated with other plastic film in order to form a laminated sheet. This method is used for improved protection of the printing ink. However, the present invention uses both direct/reverse printing on the PET film and the surface printing of anti-scratch varnish on the PET laminate sheet.

In one embodiment of this invention, it relates to a laminate having a structure comprising:
a first layer which is an outer polyethylene film;

a second layer which is an adhesive agent layer;
a third layer which is a polyester film;
a fourth layer which is an adhesive agent layer; and
a fifth layer which is a composite polyethylene film;
wherein the composite polyethylene film comprises at least one co-extr ded polyethylene layer sandwiched by at least one polyethylene film adhered to the adhesive agent layer and an inner polyethylene film.

In this invention, a layer of the polyester film is adhesive-laminated by using an adhesive agent on the top and/or bottom of the polyester film. The type of the adhesive agent used in this process is usually made of a two-component polyurethane.

The adhesive used in the adhesive-lamination can be a polyester- or polyether-based polyurethane resin. An amount of the coated adhesive is in the range from 2 to 10 $g/m^2$ and preferably from 1-8 $g/m^2$. Suitable solvents include aromatic hydrocarbons, alcohols, acetates, esters, and halogen-containing hydrocarbons.

In this invention, this adhesive-laminated PET multilayered film is further laminated with a polyethylene film using molten LLDPE by means of co-extrusion lamination.

The inner polyethylene film, the polyethylene film adhered to said adhesive agent layer, and the outer polyethylene film may be a mono-layered film, a three-layered film, or a multi-layered film.

The inner polyethylene film, the polyethylene film adhered to said adhesive agent layer, and the outer polyethylene film may be selected from the group consisting of LDPE, LLDPE, HDPE, and mixture thereof.

The inner polyethylene film, the polyethylene film adhered to said adhesive agent layer, and the outer polyethylene film may have thicknesses in the range of 90-165 microns, 120-140 microns, and 45-65 microns, respectively.

The polyester film is a polyethylene terephthalate (PET) film, preferably a printed amorphous polyester (APET) or oriented polyester (BOPET) film, and may have a thickness in the range of 12-20 microns.

The co-extruded polyethylene layer may be selected from the group consisting of an extruded LLDPE layer, an extruded LDPE layer and mixture thereof, and may have a thickness in the range of 15-80 microns.

In another embodiment of this invention, it relates to a laminate having a structure comprising:
a first layer which is an outer polyethylene film;
a second layer which is an adhesive agent layer;
a third layer which is a polyester film;
a fourth layer which is an adhesive agent layer; and
a fifth layer which is a composite polyethylene film.

Said composite polyethylene film comprises at least one co-extruded polyethylene layer sandwiched by at least one polyethylene film adhered to the adhesive agent layer and an inner polyethylene film.

Said composite polyethylene film may further comprise at least one composite EVOH layer, wherein the composite EVOH layer comprises EVOH sandwiched by tie layers. Said composite polyethylene film has a structure such that the composite EVOH layer, on the tie layers on both sides, are sandwiched by layers, each of which is at least one co-extruded polyethylene layer, and the composite EVOH layer, on the co-extruded polyethylene layers on both sides, are further sandwiched by at least one polyethylene film adhered to the adhesive agent layer and an inner polyethylene film.

Alternatively, the adhesive-laminated PET multilayered film is further laminated with a polyethylene film using a molten copolymer of ethylene and vinyl alcohol (EVOH), tie, LLDPE by means of co-extrusion lamination, The co-extrusion lamination in this step is performed in the following order: LLDPE/tie/EVOH/tie/LDPE. While the LLDPE can be replaced with low density polyethylene (LDPE) or mixture of LLDPE and LDPE, the five-layered co-extrusion lamination is existed in terms of restorability. Thicknesses of the tie layers and the LLDPE layers on both sides can be the same or different, but for a good example, the thicknesses of the LLDPE layers and the tie layers are 15 and 10 micrometers, respectively.

The composite EVOH layer comprises EVOH sandwiched by tie layers, wherein the composite EVOH layer is sandwiched by layers, each of which is at least one co-extruded polyethylene layer, on the tie layers on both sides. The co-extruded polyethylene layer on each side may have a thickness in the range of 15-30 microns, the EVOH may have a thickness in the range of 10-30 microns, and the tie layer on each side may have a thickness in the range of 10-20 microns.

The tie layer in this invention utilizes anhydride-modified polyethylene resins, low density polyethylene resins or linear low density polyethylene resins containing anhydride.

The extruded LLDPE layer may be made of a polyethylene resin with a density of 0.85-0.92 g/cc.

The outer or inner polyethylene films may be a blown film having 1-3 layers or more.

The outer and inner polyethylene films are flexible and comprise mixture of polyethylene such as high density polyethylene (HDPE), linear low density polyethylene (LLDPE) or low density polyethylene (LDPE).

Thicknesses of the inner PE film in the range of approximately 90-165 micrometers and the outer PE film in the range of approximately 45-70 micrometers are preferable. The outer and inner films are often a multi-layered blown film such as a three-layered film in order to obtain multi-layerd-film performances such as translucency, toughness, rigidity, and seal ability. The inner film having a multi-layered blown film is often used for obtaining various characteristics such as toughness, heat seal performance.

The polyethylene terephthalate (PET) film can generally be an amorphous polyester (APET) or oriented polyester (BOPET) film. A thickness of the base film can be in the range of 10-25 microns.

The EVOH in this invention utilizes an ethylene-vinyl alcohol copolymer having an ethylene content in the range from 27 to 48%. A thickness of the extruded EVOH layer can be in the range of 5-30 microns.

The co-extruded polyethylene layer may be selected from the group consisting of an extruded LLDPE layer, an extruded LDPE layer and mixture thereof, and may have a thickness in the range of 15-30 microns.

In another embodiment of this invention, it relates to a laminate having a structure comprising:
a first layer which is an outer polyethylene film;
a second layer which is an adhesive agent layer;
a third layer which is a polyester film;
a fourth layer which is an adhesive agent layer; and
a fifth layer which is a composite polyethylene film,
wherein the laminate, as mentioned above, may further comprise a composite polyester film having a structure as follows:
layer I which is a polyethylene film;
layer II which is a co-extruded polyethylene layer;
layer III which is a metalized polyester film; and
layer IV which is an adhesive agent layer, wherein the composite polyester film is disposed between the fourth layer and the fifth layer, such that layer I is adhered to the adhesive agent layer of the fourth layer.

Said composite polyethylene film comprises at least one co-extruded polyethylene layer sandwiched by at least one polyethylene film adhered to the adhesive agent layer and an inner polyethylene film, wherein the inner polyethylene film, the polyethylene film adhered to said adhesive agent layer, and the outer polyethylene film have thicknesses in the range of 90-165 microns, 120-140 microns, and 45-65 microns, respectively.

Said metalized polyester film may have a thickness in the range of 10-25 microns. Said co-extruded polyethylene layer may have a thickness in the range of 15-80 microns.

The inner polyethylene film, the polyethylene film adhered to said adhesive agent layer, and the outer polyethylene film may be a mono-layered film, a three-layered film, or a multi-layered film.

The inner polyethylene film, the polyethylene film adhered to said adhesive agent layer, and the outer polyethylene film may be selected from the group consisting of LDPE, LLDPE, HDPE, and mixture thereof.

The adhesive agent may be a two-component polyurethane. The polyester film may be a polyethylene terephthalate (PET) film, preferably an amorphous polyester (APET) or oriented polyester (BOPET) film. The third layer that is the polyester film may have been printed. The co-extruded polyethylene layer may be selected from the group consisting of an extruded LLDPE layer, an extruded LDPE layer, and mixture thereof, and may have a thickness in the range of 12-microns.

In another embodiment of this invention, it relates to a laminate having a structure comprising:
a first layer which is an outer polyethylene film;
a second layer which is an adhesive agent layer;
a third layer which is a polyester film;
a fourth layer which is an adhesive agent layer; and
a fifth layer which is a composite polyethylene film.

Said composite polyethylene film comprises at least one co-extruded polyethylene layer sandwiched by at least one polyethylene film adhered to the adhesive agent layer and an inner polyethylene film.

Said composite polyethylene film may further comprise at least one composite EVOH layer, wherein the composite EVOH layer comprises EVOH sandwiched by tie layers. Said composite polyethylene film has a structure such that the composite EVOH layer, on the tie layers on both sides, are sandwiched by layers, each of which is at least one co-extruded polyethylene layer, and the composite EVOH layer, on the co-extruded polyethylene layers on both sides, are further sandwiched by at least one polyethylene film adhered to the adhesive agent layer and an inner polyethylene film.

The laminate, as mentioned above, may further comprise a composite polyester film having a structure as follows:
layer I which is a polyethylene film;
layer II which is a co-extruded polyethylene layer;
layer III which is a metalized polyester film; and
layer IV which is an adhesive agent layer,
wherein the composite polyester film is disposed between the fourth layer and the fifth layer, such that layer I is adhered to the adhesive agent layer of the fourth layer.

The inner polyethylene film, the polyethylene film adhered to said adhesive agent layer, and the outer polyethylene film may have thicknesses in the range of 90-120 microns, 40-60 microns, and 40-60 microns, respectively.

The composite EVOH layer comprises EVOH with a thickness in the range of 10-30 microns, and the tie layer on each side having a thickness in the range of 10-20 microns.

The tie is selected from the group consisting of anhydride-modified polyethylene resins, low density polyethylene resins, and linear low density polyethylene resins containing anhydride.

The metalized polyester film has a thickness in the range of 10-25 microns. The co-extruded polyethylene layer has a thickness in the range of 15-80 microns. The inner polyethylene film, the polyethylene film adhered to said adhesive agent layer, and the outer polyethylene film are a mono-layered, three-layered, or multi-layered film.

The inner polyethylene film, the polyethylene film adhered to said adhesive agent layer, and the outer polyethylene film are selected from the group consisting of LDPE, LLDPE, HDPE, and mixture thereof.

The adhesive agent is a two-component polyurethane. The polyester film is a polyethylene terephthalate (PET) film, preferably an amorphous polyester (APET) or oriented polyester (BOPET) film. The third layer, that is the polyester film, has been printed. The co-extruded polyethylene layer is selected from the group consisting of an extruded LLDPE layer, an extruded LDPE layer and mixture thereof. The polyester film has a thickness in the range of 12-20 microns.

The metalized polyester film is obtained by evaporating either a metal, a metal oxide, or an inorganic substance on a base film made of polyethylene terephthalate (PET) with a thickness in the range of 10-25 microns. Moreover, aluminium, chrome, or aluminium oxide are utilized as the metal, the metal oxide or the inorganic material used for evaporation coating. They can be vapor-deposited on the base film via any available known methods, such as vacuum deposition, ion plating, sputtering, plasma deposition, and the like. Chemical treatment prior to the metallization can be provided for improved bonding or so called "metal adhesion" between the metal and the PET.

The following part explains this invention in details by way of examples, however this invention is not considered to be limited only to these illustrative examples. The term "LLex.65" in the examples refers to LLDPE extrusion grade with 65 micron thickness layer.

Example 1: KPL-PET-01

Outer PE Film 70/Dry/Printed PET 12/Dry/PE Film 140/LLex.65/Inner PE Film 110

A direct/reverse printed polyester film (BOPET) having a thickness of 12 microns is utilized as a substrate in order to form a multi-layered plastic sheet. This PET film was dry-laminated on one side with a polyethylene film (140 microns), and then further dry-laminated on the other side with an outer polyethylene film (70 microns). Adhesive used in this process is a urethane-based adhesive agent A coating weight of the adhesive is about 4-5 g/m². Afterwards, this laminated film is further laminated with an inner polyethylene film (110 microns) by extrusion laminating with a hot-melted LLDPE resin. Finally, conventional anti-scratch varnish is coated on the top of the laminated sheet.

Example 2: KPL-PET-02

Outer PE Film 70/Dry/Printed PET 12/Dry/PE Film 140/LLex.15/Tie 10/EV 15/Tie 10/LLex.15/Inner PE Film 110

A direct/reverse printed polyester film (BOPET) having a thickness of 12 microns is utilized as a substrate in order to form a multi-layered plastic sheet. This PET film was dry-laminated on one side with a polyethylene film (140 microns), and then further dry-laminated on the other side with an outer polyethylene film (70 microns). Adhesive used in this process is a urethane-based adhesive agent. A coating weight of the adhesive is about 4-5 g/m². Afterwards, this laminated film is further laminated with an inner polyethylene film (110 microns) by extrusion laminating with a hot-melted LLDPE resin, tie and EVOH. Finally, conventional anti-scratch varnish is coated on the top of the laminated sheet.

Example 3: KPL-PET-03

Outer PE Film 55/Dry/PET Film 12/Printing/Dry/PE Film 40/LLex.65/mPET Film 12/Dry/PE Film 40/LLex. 15/Tie 10/EVOH 15/Tie 10/LLex. 15/Inner PE Film 90

A direct/reverse printed polyester film (BOPET) having a thickness of 12 microns is utilized as a substrate in order to form a multi-layered plastic sheet. This PET film was dry-laminated on one side with a polyethylene film (40 microns), and then further dry-laminated on the other side with an outer polyethylene film (55 microns). Adhesive used in this process is a urethane-based adhesive agent. A coating weight of the adhesive is about 4-5 g/m². A metalized polyester film (mPET, 12 microns) is used in order enhance a gloss effect of a printing decoration. This metalized polyester film is dry-laminated with a polyethylene film (40 microns). Afterwards, this metalized polyester film is further laminated with an inner polyethylene film (90 microns) by extrusion-laminating with a hot-melted LLDPE resin, tie, and EVOH, and then the metalized polyester laminate part is further laminated with the polyester laminate part by extrusion-laminating with a hot-melted LLDPE resin. Finally, conventional anti-scratch varnish is coated on the top of the laminated sheet.

TABLE 1

| Examples | Thickness microns | OTR at 23° C., 0% RH cc/m² · day | WVTR at 38° C., 90% RH g/m² · day |
|---|---|---|---|
| KPL-PET-01 | 400 | 64.000 | 0.441 |
| KPL-PET-02 | 400 | 0.792 | 0.471 |
| KPL-PET-03 | 380 | 0.867 | 0.413 |

According to table 1, oxygen transmission rate (OTR) and water vapor transmission rate (WVTR) were evaluated in accordance with ASTM D3985 and ASTM F1249, respectively. KPL-PET-01 has a higher oxygen transmission rate (the lower barrier) than that of the PET/EVOH laminated sheet. This feature may become generally known through the barrier property of the PET film itself. KPL-PET-01 may be useful for manufacturing a body of a translucent laminated tube. KPL-PET-02 that has extrusion-laminating with EVOH exhibits a much higher barrier property (the lower OTR value) than that of KPL-PET-01. KPL-PET-02 may be suitable for increasing barrier in order to use for sensitive paste products. In the case of KPL-PET-03, the OTR and WVTR are almost comparable to KPL-PET-02. The metalized PET film is added in order to enhance a gloss effect of the laminate sheet. The laminated tube is ideally suited for low-oxygen-sensitive packaging of liquid or paste products.

The invention claimed is:
1. A laminate having a layer structure as follows:
a first layer which is an outer polyethylene film;
a second layer which is a first adhesive agent layer, the second layer comprising a polyester- or polyether-based polyurethane resin;
a third layer which is a polyester film comprising biaxially-oriented polyethylene terephthalate (BOPET), the third layer having a thickness of 12-20 microns;
a fourth layer which is a second adhesive agent layer, the fourth layer comprising a polyester- or polyether-based polyurethane resin; and
a fifth layer which is a composite polyethylene film,
wherein the composite polyethylene film comprises at least one co-extruded polyethylene layer sandwiched by a further polyethylene film adhered to the second adhesive layer and an inner polyethylene film, wherein each of the inner polyethylene film, the further polyethylene film adhered to said second adhesive agent layer, and the outer polyethylene film comprises a resin selected from the group consisting of LDPE, LLDPE, HDPE, and a mixture thereof, and wherein the inner polyethylene film, the further polyethylene film adhered to said second adhesive agent layer, and the outer polyethylene film have thicknesses in the range of 90-165 microns, 120-140 microns, and 45-70 microns, respectively;
wherein the biaxially-oriented polyethylene terephthalate (BOPET) film contains print; and
wherein the laminate comprises anti-scratch varnish coated on a top of the laminate.
2. The laminate according to claim 1, wherein each of the inner polyethylene film, the further polyethylene film adhered to said second adhesive agent layer, and the outer polyethylene film is a mono-layered film, a three-layered film, or a multi-layered film.
3. The laminate according to claim 1, wherein each of the first and second adhesive layers comprises an adhesive agent that is a two-component polyurethane.
4. The laminate according to claim 1, wherein the composite polyethylene film further comprises at least one composite EVOH layer, the at least one composite EVOH layer is sandwiched by first and second tie layers; wherein the composite EVOH layer is sandwiched by first and second co-extruded polyethylene layers, wherein each of the first and second tie layers comprises a resin selected from the group consisting of anhydride-modified polyethylene resins, low density polyethylene resins, and linear low density polyethylene resins containing anhydride, and wherein the first and second co-extruded polyethylene layers are sandwiched by the further polyethylene film adhered to the second adhesive layer and the inner polyethylene film, wherein each of the first and second the co-extruded polyethylene layers has a thickness in the range of 15-30 microns, wherein the composite EVOH layer comprises EVOH having a thickness in the range of 10-30 microns, and each of the first and second tie layers has a thickness in the range of 10-20 microns.
5. A laminate having a layer structure as follows:
a first layer which is an outer polyethylene film;
a second layer which is a first adhesive agent layer, the second layer comprising a polyester- or polyether-based polyurethane resin;
a third layer which is a polyester film comprising biaxially-oriented polyethylene terephthalate (BOPET), the third layer having a thickness of 12-20 microns;
a fourth layer which is a second adhesive agent layer, the fourth layer comprising a polyester- or polyether-based polyurethane resin; and
a fifth layer which is a composite polyethylene film,
wherein the composite polyethylene film comprises at least one co-extruded polyethylene layer having a thickness in a range of 15-80 microns sandwiched by a further polyethylene film adhered to the second adhesive layer and an inner polyethylene film, wherein each of the inner polyethylene film, the further polyethylene film adhered to said second adhesive agent layer, and the outer polyethylene film comprises a resin selected from the group consisting of LDPE, LLDPE, HDPE, and a mixture thereof, and wherein the inner polyethylene film, and the outer polyethylene film have thicknesses in the range of 90-120 microns, 40-60 microns, and 40-60 microns, respectively;

wherein the composite polyethylene film further comprises at least one composite EVOH layer, the at least one composite EVOH layer is sandwiched by first and second tie layers;

wherein the composite EVOH layer is sandwiched by first and second co-extruded polyethylene layers, wherein each of the first and second tie layers comprises a resin selected from the group consisting of anhydride-modified polyethylene resins, low density polyethylene resins, and linear low density polyethylene resins containing anhydride, and wherein the first and second co-extruded polyethylene layers are sandwiched by the further polyethylene film adhered to the second adhesive layer and the inner polyethylene film, wherein each of the first and second co-extruded polyethylene layers has a thickness in the range of 15-30 microns, wherein the composite EVOH layer comprises EVOH having a thickness in the range of 10-30 microns, and each of the first and second tie layers has a thickness in the range of 10-20 microns, and wherein the laminate further comprises a composite polyester film having a structure as follows:

layer I which is a polyethylene film;

layer II which is a co-extruded polyethylene layer comprising a resin selected from the group consisting of LDPE, LLDPE, HDPE, and a mixture thereof and having a thickness in a range between 15-80 microns;

layer III which is a metalized polyester film comprising metalized polyethylene terephatlate (mPET) having a thickness in a range of 10-25 microns; and layer IV which is an adhesive agent layer, wherein the composite polyester film is disposed between the fourth layer and the fifth layer, such that layer I is adhered to the second adhesive agent layer of the fourth layer;

wherein the biaxially-oriented polyethylene terephthalate (BOPET) film contains print; and wherein the laminate comprises anti-scratch varnish coated on a top of the laminate.

6. The laminate according to claim 5, wherein each of the inner polyethylene film, the polyethylene film adhered to said adhesive agent layer, and the outer polyethylene film is a mono-layered film, a three-layered film, or a multi-layered film.

7. The laminate according to claim 5, wherein each of the inner polyethylene film, the further polyethylene film adhered to said second adhesive agent layer, and the outer polyethylene film.

8. The laminate according to claim 5, wherein each of the first and second adhesive agents is a two-component polyurethane.

9. The laminate according to claim 1, which does not have a composite EVOH layer.

10. The laminate according to claim 1, wherein the laminate has an oxygen transmission rate of about 64 cc/m$^2$ per day at 23° C. and 0% relative humidity, and a water vapor transmission rate of about 0.441 g/m$^2$ per day at 38° C. and 90% relative humidity.

11. The laminate according to claim 4, wherein the laminate has an oxygen transmission rate of about 0.792 cc/m$^2$ per day at 23° C. and 0% relative humidity, and a water vapor transmission rate of about 0.471 g/m$^2$ per day at 38° C. and 90% relative humidity.

12. The laminate according to claim 5, wherein the laminate has an oxygen transmission rate of about 0.867 cc/m$^2$ per day at 23° C. and 0% relative humidity, and a water vapor transmission rate of about 0.413 g/m$^2$ per day at 38° C. and 90% relative humidity.

* * * * *